United States Patent [19]

Weyer

[11] 4,003,447
[45] Jan. 18, 1977

[54] HYDRAULICALLY POWERED STEERING SYSTEM FOR A VEHICLE HAVING MULTIPLE STEERABLE WHEELS

[75] Inventor: Paul P. Weyer, Enumclaw, Wash.

[73] Assignee: CTEC Corporation, Bellevue, Wash.

[22] Filed: June 19, 1975

[21] Appl. No.: 588,422

[52] U.S. Cl. .............................................. 180/140
[51] Int. Cl.² ......................................... B62D 5/08
[58] Field of Search ................. 180/79.2 C, 79.2 B, 180/79.2 R, 79.1, 21, 22, 23, 24, 140; 74/567, 568 R, 569

[56] References Cited
UNITED STATES PATENTS

| 2,269,502 | 1/1942 | Wilson et al. | 180/79.2 R |
|---|---|---|---|
| 3,014,548 | 12/1961 | Donner et al. | 180/79.2 B |
| 3,197,229 | 7/1965 | Houlton | 180/79.2 C |
| 3,280,931 | 10/1966 | Cahill et al. | 180/23 |
| 3,292,725 | 12/1966 | Hlinsky | 180/79.2 C |
| 3,482,643 | 12/1969 | Ivy | 180/79.2 C |
| 3,532,178 | 10/1970 | Lindbom | 180/79.2 C |
| 3,572,458 | 3/971 | Tax | 180/79.1 |
| 3,680,653 | 8/1972 | Murata et al. | 180/23 |
| 3,696,881 | 10/1972 | Gordon | 180/79.2 C |
| 3,884,320 | 5/1975 | Leveau | 180/79.2 C |

*Primary Examiner*—Philip Goodman
*Assistant Examiner*—David M. Mitchell
*Attorney, Agent, or Firm*—Christensen, O'Connor, Garrison & Havelka

[57] ABSTRACT

A load transporting vehicle has a plurality of independently steerable wheel sets, each of which incorporates a turntable having a downwardly extending strut and a pivotally mounted trailing arm that carries a wheel. The turntable is rotatably mounted on the vehicle frame. A pair of double acting piston and cylinder assemblies are coupled to rotate the turntable via a rack and pinion. A hydraulic control valve, having a control spool actuated by a boden type cable, controls the flow of hydraulic fluid to the piston and cylinder assemblies. The linear movement of the boden cable within its sheath is controlled by a rotatable cam in turn coupled to a steering wheel on the vehicle. The control valve is associated with the turntable for sliding rectilinear movement relative to the axis of rotation of the turntable and is coupled to the turntable via a rack and pinion so that the rotary motion of the turntable is translated to the control valve. When the cable is positioned at a predetermined location via movement of the steering wheel, the valve control spool is moved to initiate flow in a predetermined direction to the piston and cylinder assemblies. When the turntable rotates in response to movement of the piston and cylinder assembly, the control valve moves away from the cable, causing the control spool to recenter in its neutral position to terminate hydraulic fluid flow to the piston and cylinder assemblies.

12 Claims, 7 Drawing Figures

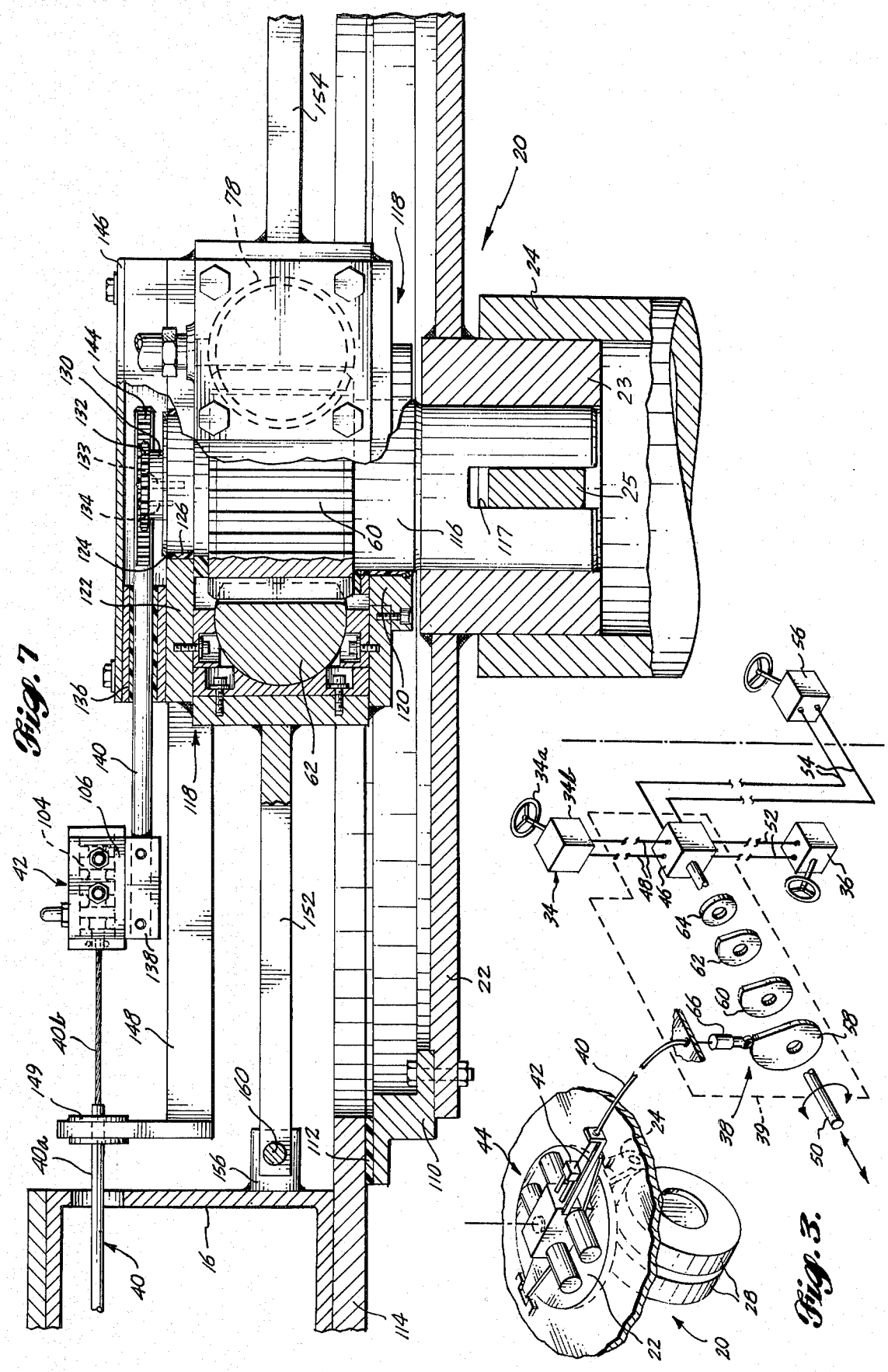

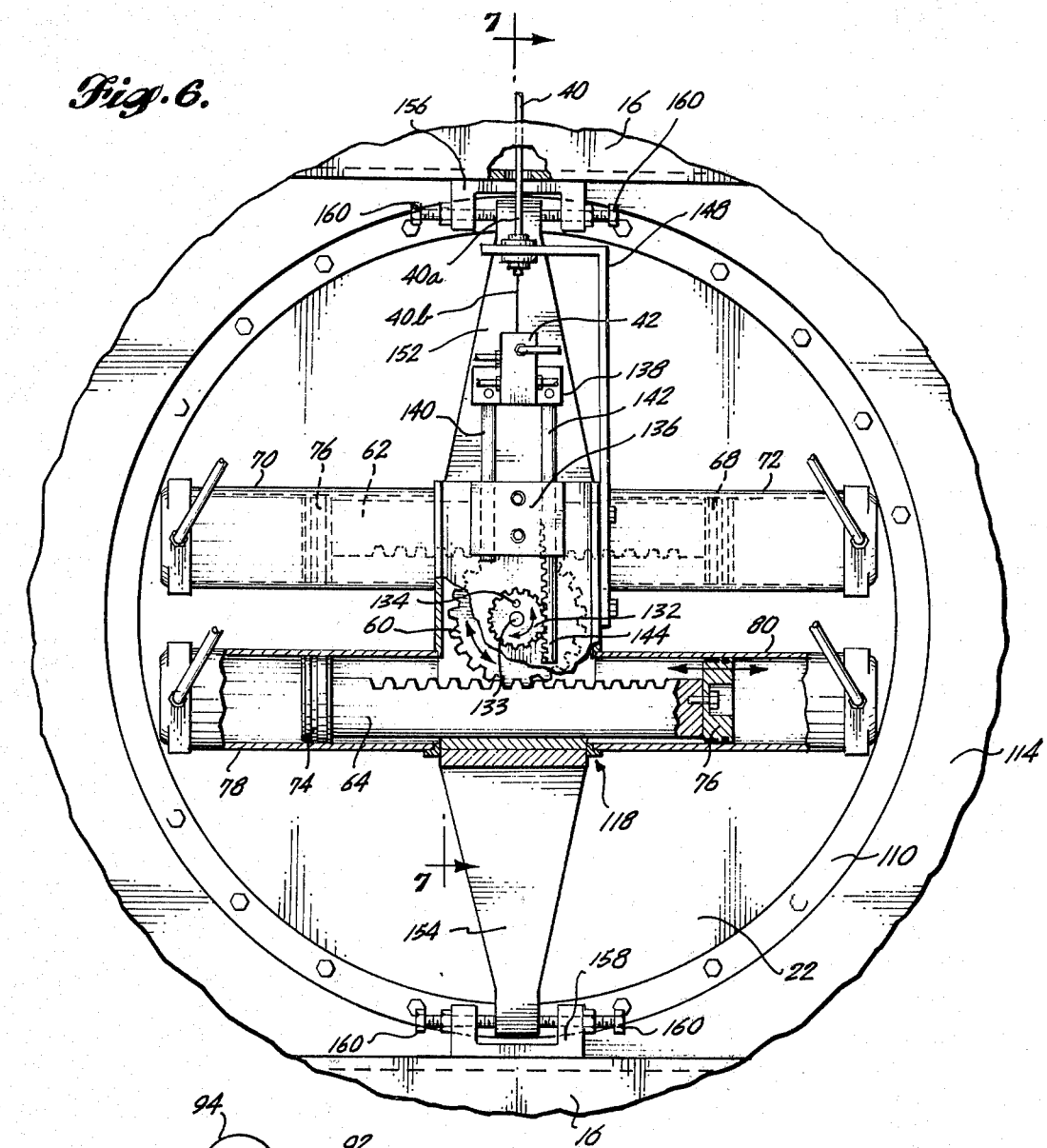
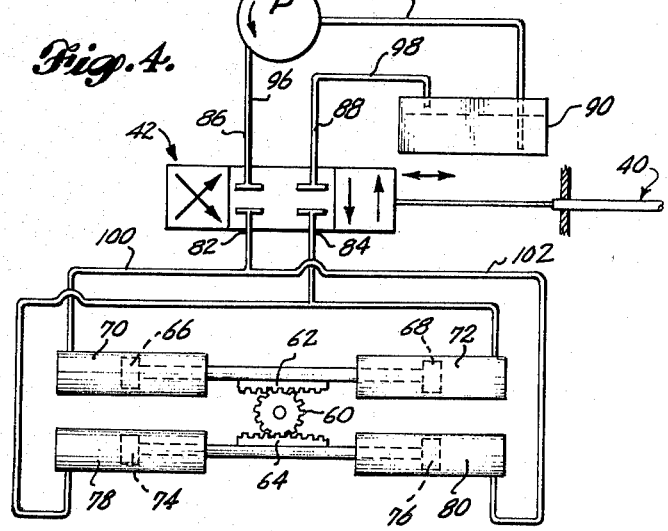
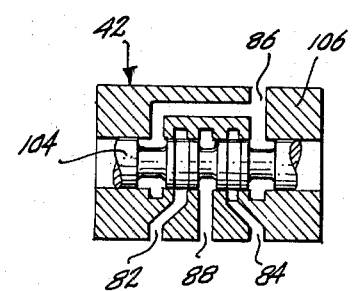

HYDRAULICALLY POWERED STEERING SYSTEM FOR A VEHICLE HAVING MULTIPLE STEERABLE WHEELS

BACKGROUND OF THE INVENTION

The present invention relates to a combination hydraulic and mechanical steering system, and more particularly to such a steering system for a vehicle having multiple independently steerable wheel sets, and most particularly, to a hydraulically powered drive mechanism for steering a wheel set that includes a combination hydraulic and mechanical feedback system.

Vehicles used for transporting large loads over relatively small distances, such as from a fabricating section of a shipyard to the assembly section of a shipyard, normally have a plurality of wheel sets supporting a load-bearing platform. Since the loads imposed upon such transporting vehicles are relatively large, the vehicles require a large number of wheels to distribute the load to the ground. The wheel sets are usually differentially steerable to provide adequate maneuvering capability and to eliminate tire scuffing when the vehicle is turned. Prior art transporting vehicles employ steerable wheel sets that provide the capability to turn in a circle, the center of which is centrally and laterally offset relative to the longitudinal dimension of the transporting vehicle. This mode of steering is normally referred to as the conventional mode. Since the plurality of wheel sets are distributed longitudinally and laterally under the load platform, each of the wheel sets must have different turning radius relative to the other so that the turning circles for the wheel sets of the entire vehicle will have a common center. One prior art device for differentially steering the wheel sets of a transporting vehicle employs only mechanical linkage between the various wheel sets. The wheel sets are interconnected by a plurality of tie rods of varying lengths coupled to radius arms affixed to the wheel sets, providing the capability to differentially turn each of the independent wheel sets so that for a given steering command, the turning radius of each of the wheel sets coincides with the common center of the desired turning circle.

In many applications it is desirable to be able to change from the conventional steering mode, wherein the transporting vehicle turns about a common center, to what is known as oblique or "crab" steering, wherein each of the wheel sets is turned through an identical angular position so that the entire vehicle can move transversely to its normally longitudinal direction of travel. With the conventional mechanical linkage used in the prior art, it is impossible to change from the conventional mode of steering to the crab mode of steering without a complete changeover of the mechanical tie rod and turning arm linkages. Because replacement of the mechanical steering linkage in this manner is not economically feasible, present transporting vehicles employing a mechanical steering system are offered with only the conventional steering mode.

In order to provide a capability of changing from a conventional steering mode to a crab steering mode, each of the wheel sets on the transporting vehicle must have the capability of being steered independently while different means for programming the turning angle of each individual wheel set for a given mode of steering must be provided. In U.S. Pat. No. 3,572,458, issued to Hans Tax, a dual mode steering system for individually steering a plurality of wheel sets is disclosed. This dual mode steering system provides the capability of changing between a conventional steering mode and a crab steering mode, as well as other capabilities. In this system a steering wheel is employed to rotate a shaft carrying a set of cams. Each cam corresponds to a given wheel set on a vehicle and has a cam follower that is coupled to an arm of a potentiometer. A variable voltage, depending upon the position of the arm connected to the cam follower, is transmitted through an electronic control circuit to a servomotor, which in turn drives a rotatable shaft on which a wheel is mounted. Feedback from the shaft to the electronic control circuit is provided via a rotational motion to rectilinear motion transducer, which in turn drives an arm of a second potentiometer. The variable voltage provided to the electronic control circuit from the second potentiometer is compared in the circuit to stop the servomotor at the position predetermined by the position of the arm of the first potentiometer. For the conventional steering mode, a first set of cams is employed that have varying cam surfaces, which are related to the desired turn radius for a given wheel set. A second set of cams, each of which is identical to the other, can be interchanged with the first set of cams to angularly position each of the wheel sets to provide the crab mode of steering.

Although the system disclosed by Tax employs a workable means by which the steering mode can be changed, it has the drawback of being electronically controlled. The environment in which many transporting vehicles employing multiple wheel sets are used is not conducive to longevity of the electronic circuitry. For example, a transporting vehicle used in a shipyard is constantly subjected to an influx of dirt, vibration, extreme temperature differentials, and saline water that cause corrosion, which results in deterioration and, ultimately, inoperability of the electronic steering circuitry. Thus such systems require constant maintenance and because of their electronic complexity require special repair skills not normally possessed by vehicle maintenance personnel.

It is therefore an object of the present invention to provide a steering system for a transporting vehicle having a plurality of steerable wheel sets that provides the capability to independently steer each of the wheel sets according to a predetermined program, that provides the capability to change among several steering modes including the conventional steering mode and the crab steering mode, that eliminates electronics from the steering control system, that is relatively easy to maintain, that can withstand the severe environmental conditions to which it is normally subjected, that can be maintained by one of ordinary skill in vehicle maintenance, that provides a quick-change capability among the steering modes, that employs a hydraulic power and control system, and that employes an angular position feedback mechanism for accurately positioning a given wheel set at a predetermined angular position relative to the transporting vehicle.

SUMMARY OF THE INVENTION

In accordance with the foregoing objects, and other objects that will become apparent to one of ordinary skill in the art upon reading the following specification, the present invention provides an improvement in a hydraulic steering system. The hydraulic steering system includes a frame, a steerable wheel supporting member mounted for rotation about a first generally vertical axis on the frame of the vehicle, a reversible hydraulic power means for varying the angular position of the steerable member on the frame, a source of hydraulic fluid, a control valve operably coupled between the source of hydraulic fluid and the power means to control the supply of hydraulic fluid to the power means. The control valve has a body and a control member therein for controlling the direction of flow from the valve dependent upon the relative position of the control member within the valve body. An actuating means is operatively coupled to the control member in the valve for moving the control member relative to the valve body upon command from the vehicle operator. First means is provided for mounting the control valve for movement relative to the steerable member. Second means couples the valve body to the steerable member to move the valve body relative to the actuating means as the shaft is rotated by the drive means. In this manner, the control member in the valve body can be moved by the actuating means from its neutral position to a position commanding the hydraulic power means to rotate the steerable member. As the steerable member rotates, the valve body is moved relative to the actuating means and the control member so that the relative movement of the valve body returns the control member to its neutral position, in turn stopping the rotation of the steerable member at a position determined by the location of the actuating means relative to the steerable member.

In addition, an easily removeable drop-in power unit for rotating a steerable member on a vehicle is provided. The power unit comprises a stub shaft carrying a large pinion operably meshing with a drive rack in turn powered by a hydraulic motor. A frame subassembly carries the rack and motor. The stub shaft is rotatably mounted in the frame subassembly. The feedback mechanism is also mounted on the frame subassembly. The stub shaft carries coupling means to be received by a steerable member on a vehicle frame. The frame subassembly also carries means that cooperates with the vehicle frame to restrain movement of the assembly relative to the frame when power is applied to the drive rack, thereby causing the steerable member to rotate in response to actuation of the hydraulic motor and to stop in response to deactuation of the motor by the feedback mechanism.

BRIEF DESCRIPTION OF THE DRAWINGS

A better understanding of the present invention can be derived by reading the ensuing specification in conjunction with the accompanying drawings wherein:

FIG. 3 is a schematic representation of the steering system showing several operator locations, a steerable wheel set, a control cable for controlling the hydraulic power means, and a means for positioning the control cable responsive to the operator's command from the steering location;

FIG. 4 is a schematic diagram of the hydraulic circuit employed with the hydraulic control and power system of the present invention;

FIG. 5 is a simplified view in partial cross section of a control valve that can be employed with the present invention; and FIG. 6 is an enlarged plan view, partially broken away of a steerable wheel set showing the steerable member, the hydraulic power means and the hydraulic control and feedback means in accordance with a preferred embodiment of the present invention; and FIG. 7 is a partially broken away enlarged elevation view in partial cross section along section line 7—7 of the assembly illustrated in FIG. 6.

DESCRIPTION OF PREFERRED EMBODIMENT

Figure 1:
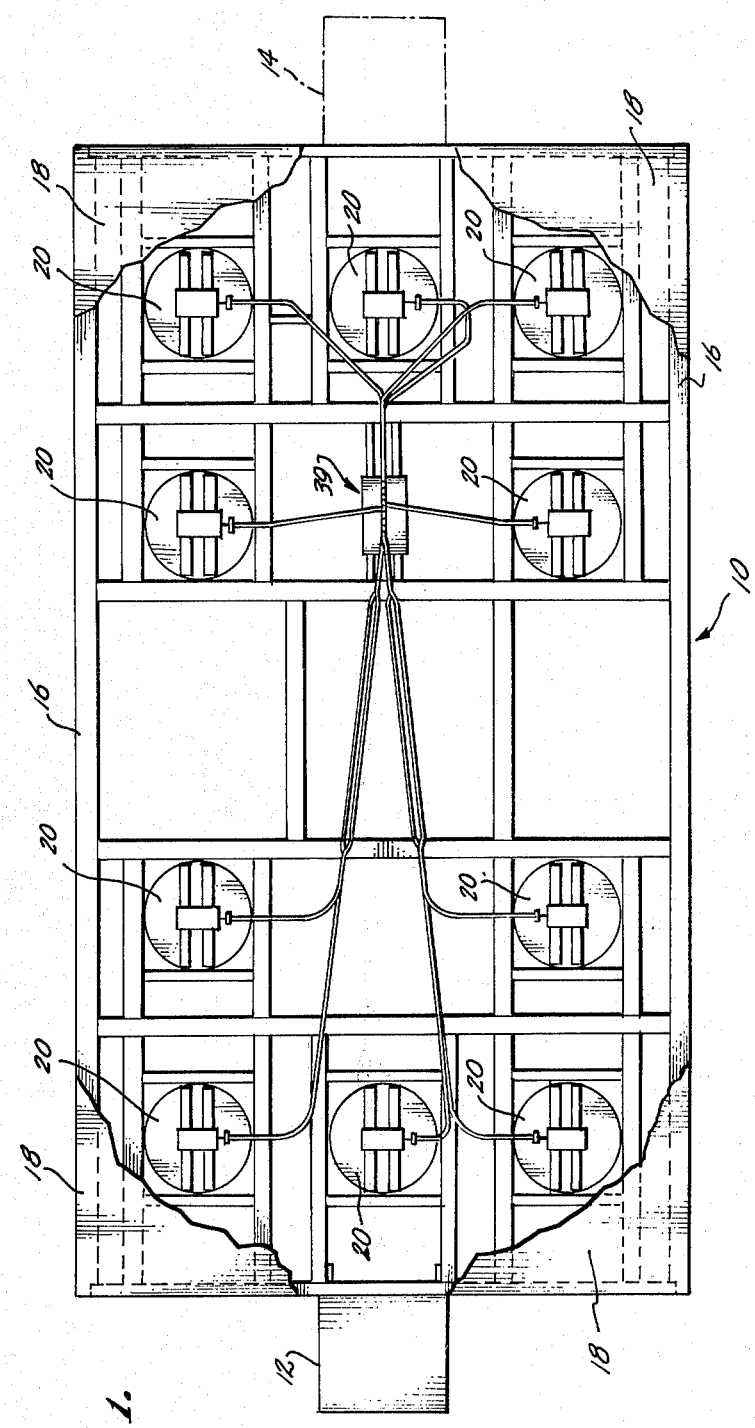
FIGS. 1 and 2 are plan and side elevations views of a transporter employing the hydraulic steering system according to the present invention.
Figure 2:
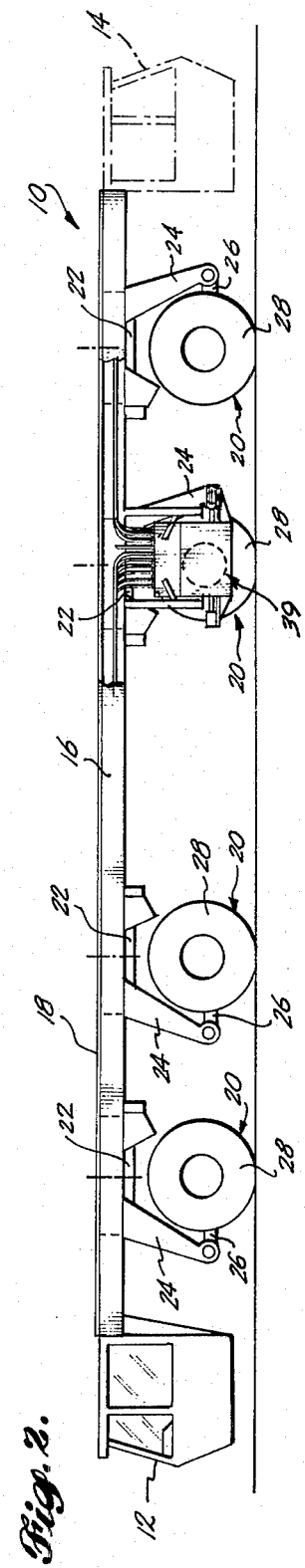

Referring first to FIGS. 1 and 2 a load transporting vehicle or transporter, generally designated 10, has operator's cabs 12 and 14 mounted at the longitudinal ends of a platform supporting, frame assembly. The platform 18 is broken away in the plan view to expose the frame assembly 16 and the location of the multiple wheel sets 20, which support the transporter for traverse over the ground. Each of the wheel sets comprises a turntable 22 to which is affixed a downwardly extending wheel supporting arm 24. A wheel suspension arm 26 is pivotally attached at its forward end to the bottom of the downwardly extending wheel supporting arm 24. A dual set of wheels 28 is rotatably mounted at the rear end of the suspension arm 26. Each of the turntables 22 is mounted for rotation relative to the frame 16 about a vertically oriented axis, i.e., an axis perpendicular to or transverse to the rotational axis of the wheels 28. A hydraulic piston and cylinder assembly having an integral shock absorber (not shown) is interconnected between the suspension arm 26 and the main wheel supporting arm 24 or the turntable 22 to fix the trailing arm in a predetermined position. By supplying fluid to or exhausting fluid from this piston and cylinder assembly, the suspension arm 26 can be swung in the vertical plane about its pivotal connection to the main support arm 24 to raise and lower the platform of the transporter relative to the ground. Thus, the transporter when in its lowered position can be driven under a load statically supported above the ground and can then be raised to elevate the load above its static support so that the load can be transported to a desired location. In this embodiment, ten wheel sets are employed, with three transversely or laterally spaced wheel sets being positioned adjacent each of the longitudinal ends of the frame 16 and two wheel sets being spaced longitudinally inwardly from the three endmost wheel sets. It is to be understood by one of ordinary skill in the art that any number of wheel sets, preferably from four to 10 or more can be used, dependent upon the physical size of the transporter and the gross vehicle weight for which it is designed.

Referring now to FIG. 3 in conjunction with FIGS. 1 and 2, the steering system for the transporter includes operator controlled steering stations 34 and 36 in each of the operator cabs 12 and 14, which can individually control a cam assembly 38 enclosed by a housing 39 shown in dotted outline, an actuating cable 40, which in turn actuates a hydraulic control valve 42 for the hydraulic power means 44 that rotates the wheel set 20. Each of the steering stations 34 and 36 comprises a steering wheel 34a coupled to a conventional hydraulic power steering servomechanism 34b, which in turn actuates a servomotor 46 in the cam assembly 38 via hydraulic conduits 48 and 52. When the steering wheel is turned, a shaft 50, coupled to the hydraulic servomotor 46, is rotated a predetermined amount dependent upon the operator's angular movement of the steering wheel. Likewise, the steering station 36 is coupled via hydraulic conduits 52 to the hydraulic servomotor 46. In addition, a third set of hydraulic lines 54 are provided so that a third steering station 56 on a second transporter can be coupled to the servomotor 46 in the event that more than two transporters are coupled in end to end relationship to carry loads larger than that for which a single transporter is designed. A plurality of cams 58, 60, 62 and 64, each of which has a cam surface of predetermined shape, is affixed to the shaft 50 in the cam assembly housing 39. Four cams are provided for each of the wheel sets on the transporter; only one sub-set is shown in FIG. 3; however, it is to be understood that a sub-set of four cams is provided for each of the ten steerable wheel sets in the transporting vehicle sown in FIGS. 1 and 2. Cam 58 is one of an interrelated set of cams that moves a cable 40 to actuate a corresponding control valve 42 to correctly position the turntable 22 according to a first desired mode of steering, for example, the conventional steering mode. The second cam 60 is a corresponding one of a second set of cams that actuates the control valve 42 according to a second mode of steering, for example, the crab steering mode. Additional modes of steering are provided by third and fourth sets of cams of which cam 62 and 64 are respectively corresponding ones for the wheel set 20 shown in FIG. 3. The third mode of steering can be one that is provided for steering an end to end coupling of two transporters in a conventional mode. The fourth mode of steering can be provided to steer the transporter in a tracking mode, i.e., a mode wherein the rear wheels are not repositioned angularly when the wheels forward of the rear wheels are steered, thus requiring the rear wheels to track or follow the turning wheels to prevent the rear of the vehicle from swinging outwardly as the vehicle turns. In the tracking mode of steering the center of the turning circle for all wheel sets resides on a transverse line through the axles of the rear wheel sets.

As shown in FIG. 3, a cam follower 66 is positioned to contact and follow the cam surface of cam 58. The follower 66 is attached to the cable of the sheathed cable assembly 40, commonly known as a boden cable. One end of the sheath of the boden cable 40 is affixed to the cam assembly housing 39 while the other end of the cable travels to its corresponding wheel assembly where the other end of the sheath is fixed relative to the turntable as will be described in greater detail below. The cam follower 66 is coupled to the cable that reciprocates within the sheath. The end of the cable opposite that attached to the follower 66 is affixed to the control member, such as the control spool, within the control valve 42. Thus, as the steering wheel in a given one of the steering stations 34, 36 or 56 is rotated, the shaft 50 is rotated via the hydraulic seromotor 46 in turn rotating the cam 58. As the cam 58 rotates the movement of the follower 66 will reposition the cable relative to its sheath and in turn actuate the control member of the hydraulic control valve 42. Thus a given setting of the steering wheel as manipulated by an operator will cause the end of the cable coupled to the control member of the hydraulic control valve 42 to move to a new position corresponding to the degree of rotation of the cam 58. As disclosed in the copending application to Hermann et al., Ser. No. 588,421, filed June 19, 1975, filed on an even date herewith, assigned to a common assignee, and expressly incorporated herein by reference, the entire assembly of four sets of cams is mounted on a single shaft 50 that can be axially shifted. In this manner the mode of steering can quickly be changed at the operator's command by relatively repositioning the follower 66 coupled to the cable 40 over the appropriate cam for each wheel set.

Referring now to FIG. 4 the hydraulic system used to power the turntable 22 to a desired angular position relative to the frame as predetermined by the position of the control cable 40 is relatively simple. The turntable of each wheel set carries a pinion 60, which is affixed to the turntable to rotate about its rotational axis. A pair of racks 62 and 64 are disposed to engage opposing sides of the pinion 60 and are arranged mutually parallel. Each of the racks serve as the piston rod for pistons mounted in cylinders at each end of each of the racks. For example, the rack 62 carries a piston 66 and a piston 68 at its opposing ends. Piston 66 is reciprocally mounted in a cylinder 70 while piston 68 is reciprocally mounted in a cylinder 72. Likewise the rack 64 carries pistons 74 and 76 at each of its ends, the pistons 74 and 76 are respectively reciprocally mounted in cylinders 78 and 80. The three-position, four-way control valve 42 is schematically represented as having a first outlet port 82 and a second outlet port 84, a pressure inlet port 86 and sump return port 88. Hydraulic fluid is supplied from a sump 90 through conduit 92 with a pressure boost provided by a hydraulic pump 94. The hydraulic pump 94 is coupled via conduit 96 to the pressure inlet port 86 of the valve 42. Likewise the sump return port 88 is coupled via line 98 to the sump 90. The first outlet port 82 of the control valve 42 is coupled via conduit 100 to mutually opposite ends of diagonally positioned cylinders 70 and 80 while the second outlet port 84 is coupled via conduit 102 to mutually opposite ends of the opposing diagonally arranged cylinders 72 and 78. When the control valve 42 is positioned so that hydraulic fluid flows from the pressure inlet port 86 to the first outlet port 82, hydraulic fluid flows into the ends of cylinders 70 and 80 causing the pinion 60 to rotate in a clockwise direction. At the same time hydraulic fluid is exhausted from cylinders 72 and 78 and returned to the sump 90 via the second outlet port 84 and the sump return port 88 of the control valve 42. When the control valve 42 is moved in the opposite direction, hydraulic fluid is caused to flow from the pressure inlet port 86 to the second outlet port 84, providing fluid pressure to the cylinders 72 and 78, and rotating the pinion 60 in a counterclockwise direction. As it rotates, hydraulic fluid is exhausted from cylinders 70 and 80 and returned to the sump 90 via the first outlet port 82 and the sump return port 88 of the control valve 42. When the control valve 42 is in the neutral or central position, no oil can exhaust from the cylinders, thus securely holding the pinion 60 in a fixed position.

The control valve 42, shown schematically in FIG. 4, is in actuality a hydraulic proportioning control valve such as that shown in cross section in FIG. 5. The control spool 104 has tapered lands so that a very slight movement of the spool 104 relative to the valve body 106 will cause oil to flow from the pressure inlet port 86 to one or the other of the first and second outlet ports 82 and 84, while oil is returning to the sump via the sump return port 88. In the actual valve structure used, the sump return port 88 is blocked when the control spool 104 is in its neutral position. Thus the hydraulic pump must be equipped with a pressure relief valve or other overload mechanisms so that the valve and the pump itself will not become overpressured during operation. Such pressure relief valves are commonly used in the hydraulic circuit art.

Referring now to FIGS. 6 and 7 the preferred embodiment of the invention will be described. The turntable 22 of each wheel set is a circular plate, which carries on its periphery an annular bearing member 110. The bearing member 110 carries on its upper surface an anti-friction ring 112 that in turn bears against the bottom side of a turntable support plate 114 mounted on the bottom side of the frame 16 at the location of each of the wheel sets. The support plate 114 has a circular opening aligned axially above the location of the axis of the turntable. The main wheel-supporting shaft 24 is affixed to a collar 23 that is in turn affixed to the central portion of the turntable 22 by conventional fastening means such as welding. The collar 23 has a central bore that slidably receives a stub shaft 116. A locking bar 25 is affixed to the inner walls of the bore in the collar 23 and is positioned diametrically across the lower portion of the bore. The bottom of the stub shaft 116 has an upwardly extending diametrically oriented slot that accommodates the locking bar 25 when the stub shaft 116 is inserted into the bore within the collar. In this manner, the stub shaft 116 is rotationally locked to the turntable 22.

The stub shaft 116 extends upwardly from the central portion of and is coaxial with the rotational axis of the turntable. The stub shaft 116 carries the master drive pinion 60, which is engaged by the two racks 62 and 64 serving as piston rods respectively for cylinders 70 and 72 and cylinders 78 and 80. The racks 62 and 64 as well as the piston and cylinder assemblies are aligned so that they are mutually parallel and so that the racks engage the teeth on the master pinion 60. The cylinders 70, 72, 78 and 80 are mounted on a central frame assembly, generally designated 118. The frame assembly is mounted for rotation on the stub shaft 116 and serves as a guide for the racks 62 and 64 as well as a mounting platform for the piston and cylinder assemblies. An annular bearing collar 120 is affixed to the lower portion of the frame assembly 118 and surrounds the portion of the stub shaft 116 below the master pinion 60. The bearing collar 120 secures the lower portion of the frame assembly 118 in rotatable relationship to the stub shaft 116. A plate 122 is mounted on top of the frame assembly 118 and is fastened thereto by suitable conventional fasteners. The upper portion of the stub shaft 116 extends upwardly through a circular opening 124 provided in the upper plate 122. A second annular bearing collar 126 is interposed between the upper portion of the stub shaft 116 and the opening in the plate 124. Thus, the plate 122 serves to support the upper portion of the frame assembly 118 in rotatable relationship to the stub shaft 116. A slave stub shaft 130 coaxially affixed to and extends upwardly from the upper end of the master stub shaft 116. A relatively small spur gear 132 is affixed to the upper end of the slave stub shaft 132 by means of an axle 133 and a keying pin 134.

A guide block 136 rests upon and is fastened to the upper surface of the upper plate 122 that forms part of the frame assembly 118. The guide block 136 contains a pair of spaced, mutually parallel bores that are aligned substantially tangentially to the periphery of the spur gear 132 on top of the slave stub shaft. The hydraulic control valve 42 is mounted on a small platform 138 radially offset from the spur gear 132 and the guide block 136. The platform is mounted for reciprocating on the guide block by a pair of mounting rods 140 and 142, which engage respective ones of the parallel bores in the guide block 136. Thus the valve platform 138 and control valve 42 are mounted for reciprocating movement relative not only to the guide block 136 but also to the turntable and the frame 16 of the entire transporter. Integral with the inner end of one of the mounting rods 142 is a slave rack 144 that intermeshes with the spur gear 132 on the top of the slave stub shaft. As the master main stub shaft 116 is rotated via the large racks and the piston and cylinder assemblies, the spur gear is also rotated causing the rack and thus the rods 142 and 140 and the valve platform as well as the entire control valve 42 to reciprocate rectilinearly relative to the frame assembly 118. A dust cover 146 is positioned over the guide block 136 and rests upon and is fastened to the upper plate 122 forming part of the frame assembly.

Radially extending torque arms 152 and 154 are fastened to the sides of the frame assembly 118 and extend in diametric directions outwardly over the turntable 22. The torque arms 152 and 154 terminate short of the frame 16 of the transporter but extend beyond the periphery of the opening formed in the turntable support plate 114. The ends of the torque arms 152 and 154 are secured in brackets 156 and 158 affixed to the frame 16 of the transporter. If it were not for these torque arms, when oil is supplied to the piston and cylinder assemblies, the frame assembly 118 would merely rotate about the stub shaft 60 and would not effect rotation of the turntable and thus the wheel assembly. A small angular adjustment is provided in the interconnection between the torque arms and the torque arm securing brackets 156 and 158. The securing brackets are provided with a yoke-like structure into which the outer ends of the torque arms extend. The yoke-like structure is provided with threaded bores aligned substantially tangentially to and above the turntable 22. Threaded bolts are inserted through these bores and bear upon the radial sides of the ends of the torque arm. The bolts are threaded into the brackets in mutually opposing directions so that the ends of the torque arms are securely held and prevented from rotating or swinging about the rotational axis of the stub shaft. Suitable lock nuts are provided for the bolts 160 to prevent them from accidentally loosening during use.

An L-shaped bracket 148 is affixed to the side of the frame assembly 118 and extends outwardly beyond the valve platform 138 in a direction generally parallel to the mounting rods 140 and 142. The L-shaped portion of the bracket 148 then extends perpendicularly so that it is interposed between the valve body and the main frame 16 of the transporter adjacent the wheel set 20. The sheath 40a of the boden cable 40 is securely affixed to the L-shaped portion of the bracket 148 by a clamp 149, so that the sheath 40a is held immovable relative to the frame assembly 118, the stub shafts 116 and 130, and thus the entire wheel set. The cable 40b within the sheath extends through an aperture in the L-shaped bracket 148 and is coupled to the control spool 104 of the control valve 42. The control spool 104 and the cable 40b are longitudinally aligned so that as the cable 40b is reciprocated within its sheath 40a, the position of the control spool of the control valve 42 can be varied relative to a given location of the valve body 106.

The drive unit, including the feedback unit, is easily removable from the turntable to provide a quick interchange between power units. In addition the power unit is adaptable to a wide variety of steering requirements that have a provision for cable actuation and a source of hydraulic fluid. By simply detaching the boden cable from the valve 42 and from the bracket 149 and by loosening the bolts 160 securing the torque arms 152 from circular movement, the power unit can be lifted away from the turntable for replacement or repair. This feature of the steering mechanism eases the task of repair and substantially reduces labor in maintenance. In addition the power unit as designed for the wheeled vehicle can be put to other steering uses with little modification to the steering assembly with which it is to be used.

In operation, when the transporter operator commands a given turning radius via his steering wheel, the cam 58 in the cam assembly (FIG. 3) causes the cable 40b of the boden cable 40 to translate within its sheath 40a (FIGS. 6 and 7). As this occurs, the control spool 104 is moved within the body 106 of the control valve 42, causing hydraulic fluid to flow into one or the other of the diagonally opposing cylinder assemblies. The hydraulic pressure is transmitted to the racks 62 and 64 in turn translating their rectilinear motion into rotational motion via the master pinion 60. As this occurs, the turntable 22 and thus the wheel assembly are rotated. As they are rotated, the slave stub shaft 130 and the spur gear 132 are also caused to rotate. The slave rack 144 meshing with the teeth of the spur gear 132 again retranslates the rotary motion of the turntable into rectilinear motion, causing the control valve mounting platform 138 to move in the same direction as the control spool 104 was moved by the cable 40b in response to the operator's command. As this occurs, the valve body 106 is moved relative to the control spool 104 so that the control spool is repositioned in its neutral position (as shown in FIG. 5). When this occurs, the flow of hydraulic fluid flow to the piston and cylinder assemblies ceases, stopping the rotation of the turntable 22. In this manner, direct mechanical feedback is provided to precisely angularly position a given wheel set in response to a command by the transporter operator.

The hydraulic steering and feedback system of the present invention provides many advantages over those used in the prior art. The disadvantages of the prior art systems have been pointed out in the background of the invention, above. In addition to fulfilling the objects set forth therein, the preferred embodiment of the invention also provides several additional advantages. First, the hydraulically powered drive system is directly mounted upon the turntable 22 via its rotational mounting on the stub shaft 116. This isolates the drive means from the contortions and possible stress loads exerted on the frame 16 itself by the load being transported. Moreover, providing the torque arms 152 and 154 with the ability to move very slightly relative to the frame 16 prevents any misalignment of the drive racks and the master pinion 60. By mounting the control valve and the mechanical feedback for the hydraulic drive means directly on the same frame assembly, the feedback mechanism is completely isolated from relative movement between the turntable 22 and the main frame 16 caused by flexure in the turntable 22. There is no relative movement between the mounting bracket 148, the sheath 40a, and the guide block 136, thus providing a very positive and precisely adjustable feedback mechanism.

The present invention has been described in relation to a preferred embodiment. One of ordinary skill in the art can make various substitutions of equivalents, and other alterations and changes without departing from the scope of the invention disclosed in the foregoing specification. For example, the hydraulic control valve can be coupled directly to the piston or piston arm of the rotary drive means of the preferred embodiment, eliminating the slave rack and pinion assembly on top of the stub shaft for moving the control valve. It is therefore intended that the protection granted by patent for the present invention be limited only by the definition contained in the appended claims.

What is claimed is:

1. A hydraulic steering system mounted on a vehicle frame comprising:
    a steerable member associated with said vehicle frame for rotational movement relative to said vehicle frame and a wheel supporting member affixed to and extending downwardly from said steerable member,
    a shaft affixed to and extending upwardly from said steerable member and being rotatable with said steerable member,
    a housing mounted on said shaft, said shaft being rotatable within said housing,
    reversible hydraulic motor means operably coupled to said steerable member to bidirectionally rotate said steerable member relative to said housing,
    an actuator means responsive to an operator command for actuating a hydraulic control valve,
    said hydraulic control valve including a body and a control member for controlling the flow of hydraulic fluid to said motor means, said control member having a neutral position relative to said body in which the flow of hydraulic fluid to the motor means is controlled to prevent said motor means from rotating said steerable member, said control member being so constructed to be responsive to movement of said actuator means on said vehicle to move said control member relative to said valve body in a first direction away from said neutral position to control the flow of fluid to said motor means, thereby causing the motor means to rotate said steerable member in a first direction,
    feedback means mounting said valve body on said housing and coupling said valve body to said shaft for moving said valve body in said first direction relative to said control member in response to rotation of said steerable member by said motor means, thereby returning said control member to its neutral position, and
    means on said housing for connecting said housing to said vehicle frame to prevent rotational movement of said housing relative to said frame while allowing said housing to move when said shaft moves transversely to the rotational axis of said shaft.

2. The system of claim 1 wherein said control valve body has a bore therein, said control member comprising a control spool mounted for reciprocating movement in said valve body, and wherein said feedback means comprises:
    means mounting said control valve body on said housing for reciprocating movement in a transverse direction relative to the axis of rotation of said shaft, said control spool being constructed for coupling to said actuator means to reciprocally move said spool responsive to a command from an operator.

3. The system of claim 2 wherein said means for mounting said control valve body for reciprocating movement comprises:
a gear fixed to said shaft coaxially with the axis of rotation of said shaft, and
a rack engaging said gear, said valve body being fixed to said rack, thereby coupling said valve body to said shaft for reciprocating rectilinear movement responsive to reversible rotation of said shaft.

4. The system of claim 1 wherein said hydraulic motor means comprises:
a linear hydraulic motor mounted on said housing said hydraulic motor being operably coupled to a toothed rack, and
a pinion fixed to said shaft, said pinion having teeth engaging the teeth of said rack.

5. The system of claim 1 wherein said means for connecting said housing to a vehicle frame comprises:
an arm fixed to said housing and extending radially outwardly therefrom in a direction transverse to the axis of rotation of said shaft, said arm having an outer end, and
means for affixing the outer end of said arm to said vehicle frame to prevent said arm from rotating about the axis of said shaft relative to said vehicle frame.

6. The system of claim 1 wherein said reversible hydraulic motor means is mounted on said housing and operably coupled to bi-directionally rotate said shaft, said shaft thereby rotating said steerable member.

7. The system of claim 6 wherein said steerable member includes a coupling member adapted to be rotatable with said steerable member, said coupling member having a channel therein, said system further comprising means for coupling said shaft to said steerable member including
an extension on said shaft constructed to be slidably inserted in said channel, and
means associated with said shaft and said coupling member for preventing relative rotation between said shaft and said coupling member when said extension is inserted in said channel.

8. The system of claim 1 wherein said actuator means includes a sheath and cable, said cable being linearly positionable within said sheath upon command of said operator, said cable being operatively coupled to said control member for moving said control member relative to said valve body in said first direction away from said neutral position responsive to an operator command, and
means affixing said sheath to said housing to prevent relative movement between said sheath and said housing and to allow relative movement between said sheath and said vehicle frame without moving said control member in the body of said valve.

9. In a hydraulic steering system including a steerable member adapted to be steered by bi-directional rotation of a shaft, said steerable member mounted on a vehicle frame, and an actuator means responsive to an operator command for actuating a hydraulic control valve, an improvement in a hydraulic power unit for said system comprising:
a shaft and a housing, said shaft being mounted for rotation on said housing,
reversible hydraulic motor means mounted on said housing and operably coupled to bi-directionally rotate said shaft relative to said housing,
a hydraulic control valve including a body and a control member for controlling the flow of hydraulic fluid to said motor means, said control member having a neutral position relative to said body in which the flow of hydraulic fluid to the motor means is controlled to prevent said motor means from rotating said shaft, said control member being so constructed to be responsive to movement of said actuator means to move said control member relative to said valve body in a first direction away from said neutral position to control the flow of fluid to said motor means, thereby causing the motor means to rotate said shaft in a first direction,
feedback means mounting said valve body on said housing and coupling said valve body to said shaft for moving said valve body in said first direction relative to said control member in response to rotation of said shaft by said motor means, thereby returning said control member to its neutral position,
an arm fixed to said housing and extending radially outwardly therefrom in a direction transverse to the axis of rotation of said shaft, said arm having an outer end,
means for affixing the outer end of said arm to said vehicle frame to prevent said arm from rotating about the axis of said shaft relative to said vehicle frame, and
means on said shaft for coupling said shaft to said steerable member for rotating said steerable member in response to rotation of said shaft.

10. A hydraulic steering system for a vehicle comprising:
a steerable member including a turntable having a bearing means associated with the periphery of said turntable for rotatably mounting said turntable on said vehicle and including a wheel supporting member affixed to and extending downwardly from said turntable,
a shaft affixed to and extending upwardly from said turntable and means coupling said shaft and said turntable for rotating said turntable in response to rotation of said shaft,
a housing mounted for rotation on said shaft,
reversible hydraulic motor means mounted on said housing and operably coupled to said shaft for bi-directionally rotating said shaft relative to said housing,
a hydraulic control valve including a body and a control member for controlling the flow of hydraulic fluid to said motor means dependent upon the relative position of said control member within said valve body, said control member having a neutral position relative to said body in which the flow of hydraulic fluid to the motor means is controlled to prevent said motor means from rotating said shaft,
an operator controlled steering means including a sheath and cable, said cable being linearly positionable within said sheath upon command of said operator, said cable being operatively coupled to said control member for moving said control member relative to said valve body in a first direction away from said neutral position responsive to an operator command, thereby controlling the fluid flow from said control valve to said hydraulic drive means to cause said drive means to rotate said steering member in a first direction, means associated with said housing for coupling said valve body to said steerable member to move said valve body in said first direction relative to said control member responsive to rotation of said steerable member by said drive means, thereby relatively returning the control member to its neutral position, and means affixing said sheath to said housing to prevent relative movement between said sheath and said housing and to allow relative movement between said sheath and said frame without moving said control member in said hydraulic control valve means.

11. The steering system of claim 10 wherein said control valve has a bore therein, said control member comprising a spool mounted for reciprocal movement in said bore, and wherein said means coupling said valve body to said steerable member comprises means mounting said control valve body for reciprocating movement in a transverse direction relative to the axis of rotation of said steerable member, said actuating member being so coupled to reciprocally move said spool responsive to a command from an operator.

12. The steering system of claim 11 wherein said means mounting said control valve body for reciprocating movement comprises:

a gear fixed to said shaft coaxially with the axis of rotation of said shaft, and a rack engaging said gear, said valve body being fixed to said rack, thereby coupling said valve body to said shaft for reciprocating, rectilinear movement responsive to reversible rotation of said steerable member.

* * * * *